(12) United States Patent
Cochran et al.

(10) Patent No.: US 10,212,925 B2
(45) Date of Patent: Feb. 26, 2019

(54) METHODS AND APPARATUS FOR THREADING FISHING HOOKS

(71) Applicants: Jimmy Charles Cochran, Friendsville, TN (US); Stacy Lee Chambers, Maryville, TN (US)

(72) Inventors: Jimmy Charles Cochran, Friendsville, TN (US); Stacy Lee Chambers, Maryville, TN (US)

( * ) Notice: Subject to any disclaimer, the term of this patent is extended or adjusted under 35 U.S.C. 154(b) by 0 days.

(21) Appl. No.: 15/462,837

(22) Filed: Mar. 18, 2017

(65) Prior Publication Data

US 2017/0332616 A1 Nov. 23, 2017

Related U.S. Application Data

(60) Provisional application No. 62/340,084, filed on May 23, 2016.

(51) Int. Cl.
*A01K 97/00* (2006.01)
*A01K 83/00* (2006.01)
*A01K 99/00* (2006.01)
*A01K 91/06* (2006.01)
(Continued)

(52) U.S. Cl.
CPC .............. *A01K 91/06* (2013.01); *A01K 83/00* (2013.01); *A01K 87/007* (2013.01); *A01K 91/04* (2013.01); *A01K 97/00* (2013.01); *A01K 99/00* (2013.01)

(58) Field of Classification Search
CPC ........ A01K 97/00; A01K 99/00; A01K 83/00; A01K 87/007

USPC .............. 43/25, 25.2, 43.16, 44.83; 289/17; 223/99
See application file for complete search history.

(56) References Cited

U.S. PATENT DOCUMENTS 232,185 A * 9/1880 Jaccard ................. D05B 87/00
223/99
886,375 A * 5/1908 Koon ..................... D05B 87/00
223/99
(Continued)

FOREIGN PATENT DOCUMENTS

DE    102011076288 B4 *  3/2013 ............ A01K 91/04
WO   WO-2004026027 A1 *  4/2004 ............ A01K 97/06
WO   WO-2012143538 A2 * 10/2012 ............ A01K 91/04

*Primary Examiner* — Darren W Ark
(74) *Attorney, Agent, or Firm* — Fred Lane Martin (57) ABSTRACT

The threading apparatus and methods of threading various types of fishing hooks and lures of this invention provide convenience and ease of use applicable to a wide range of hook sizes, shapes, and types. The threading apparatus is fabricated as a single molded part body made from an elastomeric material such as TPE with molded sectors including: slotted clip sector, chamfered frustoconical sector, non-chamfered frustoconical sector, slotted hook eyelet positioning curb, an at least one set of elongated hook shank holding ribs, and an exit sector. The invention provides simplified and enhanced threading operations which include hooks with particularly small eyelets or thin shank diameters, weighted hooks, and for fly hooks (lure hooks) or bodied hooks with particularly short exposed shank length. The facility for enhanced threading operations relies on the molded elastomeric material properties of the threading apparatus body including a durometer range comprehending flexibility without significant deformation memory.

9 Claims, 6 Drawing Sheets

(51) Int. Cl.
*A01K 91/04* (2006.01)
*A01K 87/00* (2006.01)

(56) References Cited

U.S. PATENT DOCUMENTS

| | | | | | |
|---|---|---|---|---|---|
| 1,769,249 | A | * | 7/1930 | Ahola | D05B 87/00 223/99 |
| 2,682,126 | A | * | 6/1954 | Shepherd | A01K 91/04 223/99 |
| 2,843,961 | A | * | 7/1958 | Semple | A01K 91/04 289/17 |
| 3,357,086 | A | * | 12/1967 | Hood | A01K 91/04 223/99 |
| 3,402,957 | A | * | 9/1968 | Peterson | A01K 91/04 289/17 |
| 3,839,811 | A | * | 10/1974 | Hopkins | A01K 87/00 43/25.2 |
| 4,573,719 | A | * | 3/1986 | Aldridge | A01K 91/04 223/99 |
| 4,667,433 | A | * | 5/1987 | Thompson, Jr. | A01K 97/06 43/25.2 |
| 4,697,370 | A | * | 10/1987 | Vissing | A01K 91/04 289/17 |
| 4,873,780 | A | * | 10/1989 | Lancette | A01K 87/00 43/25.2 |
| 4,987,697 | A | * | 1/1991 | Klein | A01K 91/04 43/44.83 |
| 5,383,695 | A | * | 1/1995 | Couper | A01K 91/04 289/17 |
| 5,586,404 | A | * | 12/1996 | Freitas | A01K 97/08 43/21.2 |
| 5,806,235 | A | * | 9/1998 | Martin | A01K 97/06 43/57.1 |
| 6,021,597 | A | * | 2/2000 | Lajoie | A01K 87/02 43/25 |
| 6,041,541 | A | * | 3/2000 | Davis | A01K 91/04 112/225 |
| 6,523,987 | B1 | * | 2/2003 | Lee | A01K 87/007 362/120 |
| 6,625,921 | B2 | * | 9/2003 | Friederichs, III | A01K 91/04 43/4 |
| 7,168,202 | B2 | * | 1/2007 | Kohler | A01K 97/06 43/25.2 |
| 7,793,458 | B2 | * | 9/2010 | Eisbrenner | A01K 87/007 43/4 |
| 7,793,459 | B1 | * | 9/2010 | Ruzicka | A01K 91/04 43/42.49 |
| 8,635,805 | B1 | * | 1/2014 | Schmunk | A01K 97/04 206/540 |
| 8,863,339 | B2 | * | 10/2014 | Mariotti | A01K 91/04 7/106 |
| 9,084,414 | B1 | * | 7/2015 | Fender | A01K 91/04 |
| 9,332,745 | B2 | * | 5/2016 | Mashhour | A01K 91/04 |
| 2006/0162231 | A1 | * | 7/2006 | Massimino | A01K 97/06 43/25.2 |
| 2007/0193104 | A1 | * | 8/2007 | Molyneux | A01K 91/04 43/4 |
| 2012/0005939 | A1 | * | 1/2012 | Vandewalle | A01K 91/04 43/4 |
| 2014/0167413 | A1 | * | 6/2014 | Ross | A01K 91/04 289/1.5 |
| 2016/0081318 | A1 | * | 3/2016 | Rothan | A01K 83/00 43/44.9 |

* cited by examiner

FIG. 6C

METHODS AND APPARATUS FOR THREADING FISHING HOOKS

CROSS REFERENCE TO RELATED APPLICATIONS

The present application claims the filing benefits of U.S. provisional application Ser. No. 62/340,084 filed May 23, 2016, which is hereby incorporated herein by reference in its entirety.

TECHNICAL FIELD

This invention generally relates to an apparatus for a threader. More specifically, the present invention is an apparatus for a fishing hook fishing line threader. The fishing hook may be stand alone or built into a lure such as a fishing fly. The hook may also be part of a cluster of multiple hooks sharing a common shank and eyelet.

BACKGROUND OF THE INVENTION

Putting a fishing line through a hook eyelet is problematic for several reasons including, but not limited to, poor vision or blindness, exceedingly small hook eyelets, night fishing, low lighting conditions, standing upright on an unruly boat or floatation device while threading a hook, motion from a rocking boat, canoe, or kayak, high wind conditions, and additional possible distractions.

Fishermen historically have sometimes used tweezers to assist with threading fish hooks. However this approach of using tweezers does not resolve most of the problematic aspects of threading fish hooks given various conditions. For night fishing and many other conditions, threading a hook can be frustrating and time consuming, time not spent actually fishing.

When fishing for walleye in the spring, using a live-bait presentation, size 8 or 10 hooks are common, while bass fishermen use 1/0 to 2/0 hooks for baiting shiners or minnows. Size 8 to size 12 hooks are commonly used to catch bluegills. An easy to use hook threading apparatus has long been needed to address the hooks and other sizes too.

A wide range of fish hooks sizes are standardized. Hooks are classified by "sizes"—for example, a size 1 hook is larger than a size 7, while a 1/0 is smaller than a 7/0 (pronounced 7-aught). The smallest exemplary standard sizes available are 32 and the largest 20/0.

The slash symbol (/) defines a hook as grouped within the "aught" measurement system. As defined in aughts, the higher the number, the larger the hook. A 1/0 hook is bigger than a size 1. They ascend in accordance to their increased size. Therefore, a #6/0 hook is larger than #2/0, but an ordinary #6 is smaller than #2.

Hooks are also made from various wire gauges or thickness. They run from very thin wire to thicker gauge wire, for example: fine wire, heavy wire, extra heavy, 2× heavy, 3× heavy, 4× heavy and higher. Hooks made from thinner or fine wire have correspondingly smaller eyelet diameters and even smaller openings. Smaller eyelet opening sizes are harder to thread and thinner hook shanks are harder to grasp or hold for alignment or positioning.

The anatomy of the hook is as follows: The point is the sharp end that penetrates the fish's mouth. To achieve the point, the hooks are either mechanically or chemically sharpened. Some hooks are barbless to make hook removal easier and less stressful to the fish. Jutting off the point is the barb, which is a sharp tip that prevents the hook from backing out. The eye connects the hook to the fishing line, which is achieved by using any one of a variety of knots. The shank is the portion of the hook that connects the point and the eye; the gape or gap describes the distance between the shank and the point. Some of these features often describe the type of the hook, for instance, a long shank hook, a wide-gap hook or an offset eye hook.

Hooks are manufactured from many different metals such as high carbon steel, vanadium and stainless steel. Stainless steel is losing favour due to its negative effects on the environment.

Hooks fall into six major categories; "J" hooks, Circle hooks, treble hooks, wire hooks, thick hooks, and Kahle hooks. The most popular hooks are "J" hooks.

Due to the wide range of hook styles and sizes including hooks embedded into lures such as fishing flies, it is important to have a fishing hook threader apparatus and methods that provide the user with reliable single attempt threading for appropriate hook size ranges. The appropriate range of sizes starts with the smallest of hooks (approximately #12) and extent up to a size whereby the eyelet is so large that a threading device or apparatus is not needed depending on the user.

Hooks with particularly small eyelets, thin shanks, or short shanks are especially hard to thread. For this reason no threading devices have emerged that can assist the operator to thread a full range of hooks including the particularly small eyelets, thin shanks, or short exposed shanks. Hooks are classified by "sizes"—for example, a size 1 hook is larger than a size 7. Examples of hook sizes difficult to thread include the smallest fishing flies and the smallest hook sizes in the range of #12 to #32 and including fine wire shanks.

With regard to bodied hooks such as weighted hooks or lure hooks including for example, fly hooks, a particularly short exposed shank length as measured by the distance from the eyelet to the body having an approximate length of 0.14 inches (3.56 mm) or less.

There has been a long standing need for an easy to use threading apparatus or facility along with straightforward methods including a simplified method and enhanced methods that can be used effectively and reliably over a full range of hook sizes, shapes, and configurations.

Due to the wide variety of hooks, lures, and weighted hooks regarding sizes and shapes, creating and designing a threading apparatus or facility that is inclusive and effective has required much knowledge, effort, and testing to complete.

This invention solves the fisherman's fish hook threading needs with a simple, easy to use, low cost apparatus with expedient and effective methods of using the threading apparatus or facility. It is therefore an object of the present invention to provide such an apparatus and associated methods for threading a wide range of fishing hook sizes, shapes, and configurations.

BRIEF DESCRIPTION OF THE INVENTION

The invention disclosed herein solves the long standing need for hook threading embodiments and methods that can be used effectively and reliably over a full range of hook sizes, shapes, and configurations including the smaller, more difficult to thread examples.

The terms, "threading operation" or "threading operations" is defined to be equivalent to the term "threading" throughout this disclosure. The term "lure hook" herein includes any type of fishing fly, top water fly, or bug type lure. The term "bodied hook" herein includes a weighted hook or any form of lure hook.

The use of the terms fishing line, leader, and line are interchangeable herein and the use of the term "line" is particularly defined as the alternative equivalence to the terms fishing line or leader. The term "threaded line" is a line that has been threaded into and through a fishing hook eyelet, with or without a body attached including a weight, a lure, a lure body, or a fishing fly.

Some or all of the above insights, needs, problems, and limitations may be addressed by the invention asserting that the fullest extent of the invention may not be captured in the following summary:

A fish hook threading apparatus constructed as a single part body made from a molded elastomeric material includes molded sectors including; a slotted clip sector, a chamfered frustoconical sector, a non-chamfered frustoconical sector, a slotted hook eyelet positioning curb, an at least one set of elongated hook shank holding ribs, and an exit sector.

A threading apparatus line entry and exit path for threading a various types of hooks and lures.

A continuous line escapement path along the top of the threading apparatus including an open chamfered frustoconical sector adjoined to an escapement slot that runs along the top edge of the apparatus formed by opposite side walls of extended members of the body. The escapement slot allows a threaded line to be lifted out from a slotted hook eyelet positioning curb and the exit sector which is in the form of an exemplary slotted exit cavity.

The slotted fish hook eyelet positioning curb located at the distal end of the frustoconical sector wherein the eyelet is positioned to provide a threading path for the line through the eyelet whenever the face of the eyelet is flush with the inner face of the curb. The curb also includes an outer face distal to the inner face, the outer face adjacent to the exit chamber.

Methods and facility are provided by the invention for enhanced threading operations for hooks with particularly small eyelets or thin shank diameters, and bodied hooks, with particularly short exposed shank length. The facility for enhanced threading operations relies on the molded elastomeric material properties of the threading apparatus body including durometer.

The associated enhanced hook eye alignment and threading methods which are dependent upon the material properties of the threading apparatus body and the shape and size characteristics of a fish hook, or bodied hook include:
 a. For small hooks, aligning the hook eyelet in the threading position then using squeezing force transversely deforming the extended members to provide frictional force to the hook shank as grippers to hold particularly small hooks or shanks while threading.
 b. For short exposed shanks of bodied hooks between the body to the eyelet: an inward pressing force at the head or by gripping the body and pressing inward to deform by compressing the extended members inwardly to align the eyelet face with the center of the curb inner face threading position, and is held in place by a sustained pressing force maintaining alignment while threading.

Use of the threading apparatus includes hook attachment or maintained alignment, threading, and escapement:
 a. threading includes positioning and aligning a hook to be threaded, inserting a line through the chamfer of the frustoconical sector and extending the line through the distal end of the frustoconical sector, the line passing through the hook eyelet, the curb opening, and extending through and beyond the exit chamber
 b. escapement includes lifting the line with the threaded hook out of the curb slot and continuing threading through the continuous line escapement slot

BRIEF DESCRIPTION OF THE DRAWINGS

The foregoing, and other aspects, and embodiments will be better understood from the following detailed description of the exemplary embodiments of the invention with reference to the drawings, in which.

DETAILED DESCRIPTION

Example embodiments of the invention are described more fully with reference to the accompanying and incorporated by reference (cross-referenced) drawings, in which embodiments of the invention are shown. This invention may, however, be embodied in many different step sequences, forms, structures, or materials and should not be construed as limited to the embodiments set forth herein. Rather, these embodiments are provided so that this disclosure will be thorough and complete, and will fully convey the scope of the invention to those skilled in the art.

Like identified numbers refer to like elements throughout. The use of asterisks herein is indicative of multiplication operations unless otherwise noted.

It should be noted that, as used in the specification and the claims, the singular forms "a" and "the" include plural referents, unless the context clearly dictates otherwise.

An elastomer is a natural or synthetic polymer having elastic properties, e.g., TPE or rubber. Durometer is an industry standard hardness measurement for elastomers and an indirect measure of the stiffness, or more correctly the modulus, of an elastomeric material. By selecting a useful set of material properties for body composition and physical embodiments, certain methods and operational capabilities of a fishing line threading apparatus are enabled or enhanced that increase the useful range of hook sizes, shapes, and configurations supported.

An exemplary range of durometer preferable for both enhanced and simplified or non-enhanced threading embodiments and methods is 30-75 durometer one important property of a "suitable material." Another important property is referred to as material memory since it is important that a threading facility or apparatus returns to its original shape after normal or operational deformations.

FIGS. 1A-1E are various pictorial views of threading apparatus or facility 101.

The overall size, shape, and sectors of the apparatus or facility 101 is scalable to a larger or smaller size to address a larger range of hook sizes or respectively, a smaller range of hook sizes for use of a simplified threading method vs. an enhanced threading method.

Figure 1A:
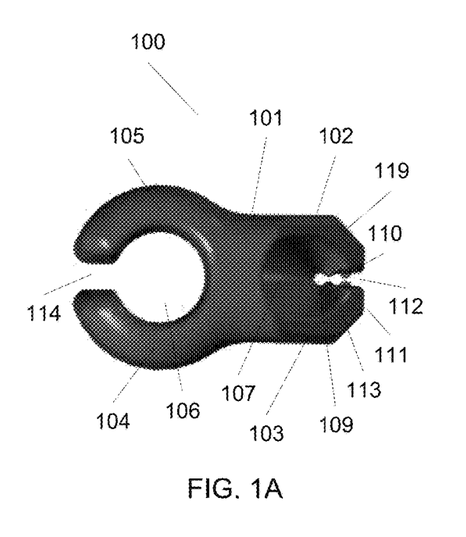
FIG. 1A is a pictorial threading path entry view of an exemplary embodiment oriented exposing the chamfered frustoconical opening.

With reference to FIG. 1A, a side view 100 of an exemplary embodiment of the invention is shown with various features and sectors identified as follows: The body 101 of the embodiment consists of suitable material, size, and shape to facilitate both simplified and enhanced threading operations described herein. The body 101 identified FIG. 1A is also shown in each of the FIGS. 1B-1E as differing views and orientations of the same body.

With continued reference to FIG. 1A, members 102 and 103 are referred to as "extended members" providing a squeezing sector for enhanced threading operations requiring temporary deformation of the extended members and adding holding force to the eyelet and hook shank primarily between the holding ribs 110 and 111 in order to hold a small hook (with a small eyelet or thin hook shank) in aligned position with the eyelet face in approximate contact with the inner face of a slotted curb forming the opening 109.

Figure 1B:
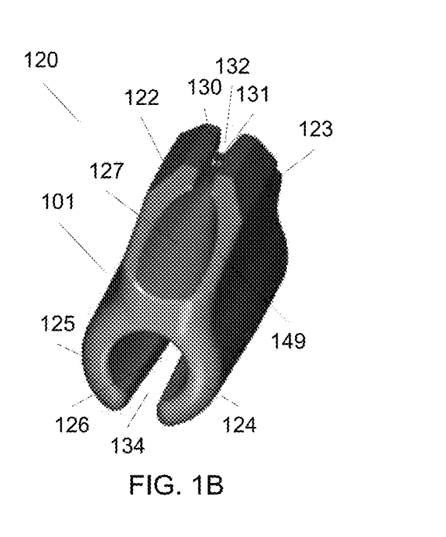
FIG. 1B is a pictorial isometric view of an exemplary embodiment of the threading apparatus.
Figure 1C:
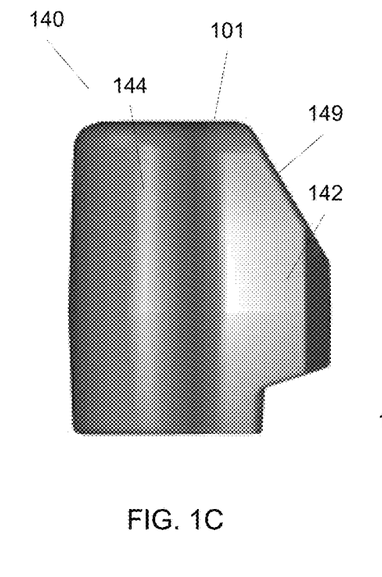
FIG. 1C is a pictorial side view of an exemplary embodiment.
Figure 1D:
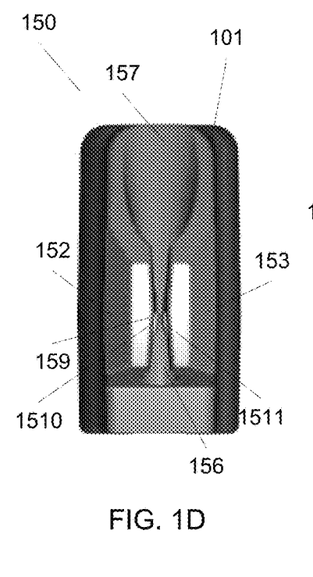
FIG. 1D is a pictorial top view of an exemplary embodiment exposing the full length of the threading pathway and each of the sectors involved.

Extended members are also seen in other views including 122 and 123 in FIG. 1B as well as 152 and 153 in FIG. 1D. The holding ribs are also seen in other views including 130 and 131 in FIG. 1B as well as 1510 and 1511 in FIG. 1D. The inner face of a slotted curb (not shown) forming the opening 109 with line escapement slot 113 in FIG. 1A is also identified at 159 in FIG. 1D.

With renewed reference to FIG. 1A, the extended members 102 and 103 are also used for enhanced threading operations of bodied hooks with short exposed shanks accessible between the lure head and the eyelet. Alignment of a bodied hook eyelet with a short exposed shank is achieved by compressing the extended members 202 and 203 using a pressing force on the lure head until the bodied hook is aligned with its eyelet face approximate contact with the inner face of the slotted curb forming the opening 109.

With continued reference to FIG. 1A, the extended members also provide a line escapement slot 112 between the members for removal of threaded hooks (hooks and line) after any threading operation. The line escapement is also identified in another view at slot 128 continuing to 132 in FIG. 1B.

With continued reference to FIG. 1A, the simplified threading method not requiring any manual alignment or holding of forced deformations of the extended members 102 and 103 is performed in three basic steps; first aligning and fixating a hook to be threaded, secondly threading the hook, and finally removing the threaded hook. Tying the hook and line can then be performed starting with a threaded hook. The extended members are also seen in other views including 122 and 123 in FIG. 1B as well as 152 and 153 in FIG. 1D. Another extended member is visible at 142 in FIG. 1C.

The simplified threading method includes accessing the frustoconical cavity 107 through the chamfered side 119 with a hook eyelet and sliding the hook eyelet along the conically narrowing cavity until it is stopped by the slotted curb at its inner face forming the curb, then rotatively aligning the hook eyelet face with the inner face of the curb forming opening 109. Once in the aligned position, the hook becomes fixated in the threading apparatus based of frictional forces provided by holding ribs 110 and 111 without the potential for it to slip from or fall out of the threading apparatus regardless of orientation thus freeing a hand for threading the line while the remaining hand holds the threading apparatus body 101.

Threading the line with a fixated hook in threading position is easily accomplished by feeding the line through the frustoconical sector shown as 107 in FIG. 1A and 127 in FIG. 1B, with an alternate view 150 at 157 in FIG. 1D, its open distal end aligned with the hook eye and transitioning through the hook eyelet passing through opening 109 in FIG. 1A at the curb 159 in FIG. 1D and entering in the exit chamber 156 in FIG. 1D to finally emerge from the exit chamber 156 in FIG. 1D. The line and threaded hook can be removed from the threading apparatus by lifting the line with the threaded hook out of the threading apparatus through the line escapement slot 112 in FIGS. 1A and 132 in FIG. 1B.

As seen in FIG. 1A, the threading apparatus includes a view for clipping or attaching it onto a fishing rod or essentially cylindrical object. The attaching sector view includes two clamping jaws 104 and 105 forming a partially enclosed capture and attachment cavity 106 and temporarily deformable to the extent that the jaws 104 and 105 separate from their normal positions at attachment slot 114 temporarily to allow entry and capture of a fishing rod for example.

Views other than FIG. 1A, including FIG. 1B-1E show equivalent functionality pertaining to attachment but alternate orientations of the same features described in previous FIG. 1A descriptions:

With reference to FIG. 1B, view 120, the attaching sector view of the threading apparatus body includes two rod clamping jaws 124 and 125 forming a partially enclosed rod attachment cavity 126 and deformable to the extent that the jaws 124 and 125 separate from their normal positions temporarily at rod attachment slot 134 to allow entry and capture of a fishing rod for example.

With reference to FIG. 1C, view 140, the pictorial side view of the threading apparatus body 101 shows a single exposed rod clamping jaw 144 whereby the opposing rod clamping jaw is hidden from view along with the rod attachment cavity. The frustoconical chamfer 149 is shown extending into the exposed extended member 142.

With reference to FIG. 1D, view 150, the pictorial top view of the threading apparatus body 101 shows extended members 152 and 153, chamfered frustoconical cavity 157, alignment and positioning curb opening 159, hook shank holding ribs 1510 and 1511, and line threading exit cavity 156.

Figure 1E:
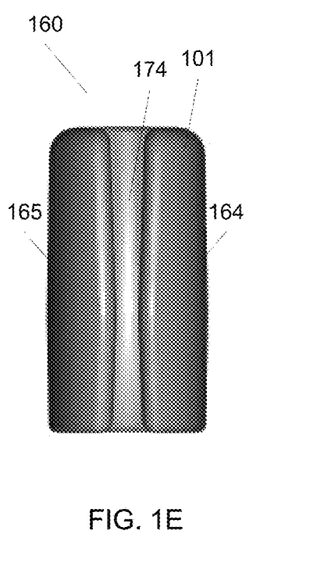
FIG. 1E is a pictorial bottom view of an exemplary embodiment exposing the slotted clip sector used to attach the threading apparatus to a fishing rod or other cylindrical device.

With reference to FIG. 1E, view 160, the attaching sector view includes two clamping jaws 164 and 165 of the threading apparatus body forming a partially enclosed attachment slot 174 and temporarily deformable to the extent that the jaws 164 and 165 separate from their normal positions temporarily to allow entry and capture of a fishing rod for example.

FIGS. 2A-2E are dimensioned line drawings of various views of threading apparatus or facility 201. NOTE: Dimensions on FIGS. 2A-2E are nominal and subject to range limits as further disclosed in the specification.

The overall size, shape, and sectors of the apparatus or facility 201 is scalable to a larger or smaller size to address a larger range of hook sizes or respectively, a smaller range of hook sizes for use of a simplified threading method vs. an enhanced threading method.

Figure 2A:
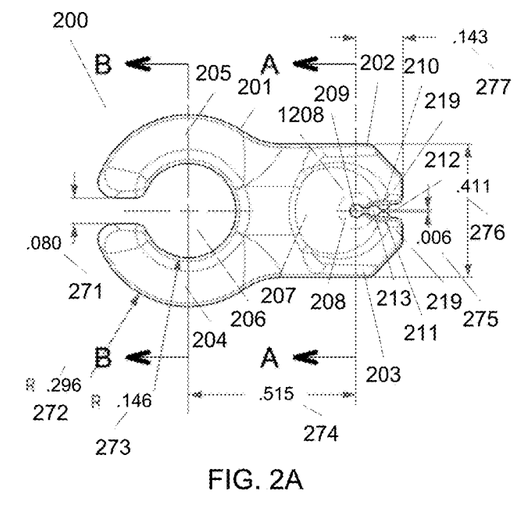
FIG. 2A is a nominally dimensioned side view line drawing of an exemplary embodiment with sections A-A and B-B identified.

With reference to FIG. 2A, a side view 200 of an exemplary embodiment of the invention is shown with various features and sectors identified as follows: The body 201 of the embodiment consists of suitable material, size, and shape to facilitate both simplified and enhanced threading operations described herein. The side view 200 is shown including sectional identifiers A-A further detailed in FIG. 2D and B-B further detailed in FIG. 2E. The body 201 identified FIG. 2A is also shown in each of the FIGS. 2B-2E as differing dimensioned line drawing views and orientations of the same body.

With continued reference to FIG. 2A, members 202 and 203 are referred to as "extended members" providing a squeezing sector for enhanced threading operations requiring temporary deformation of the extended members and adding holding force to the eyelet and hook shank primarily between the holding ribs 210 and 211 in order to hold a small hook (with a small eyelet or thin hook shank) in aligned position with the eyelet face in approximate contact with the inner face of a slotted curb forming the opening 209.

Figure 2B:
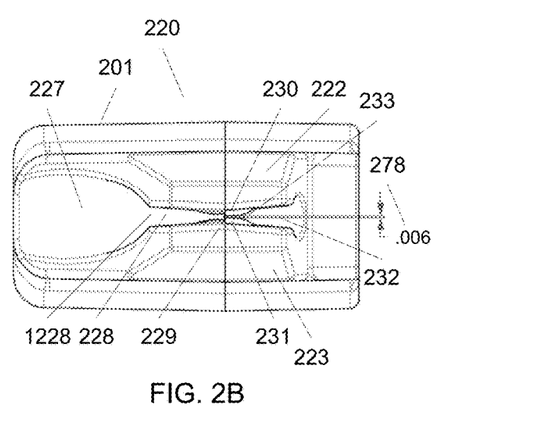
FIG. 2B is a partially dimensioned top view line drawing of an exemplary embodiment revealing the full length of the threading pathway and each of the sectors involved.
Figure 2C:
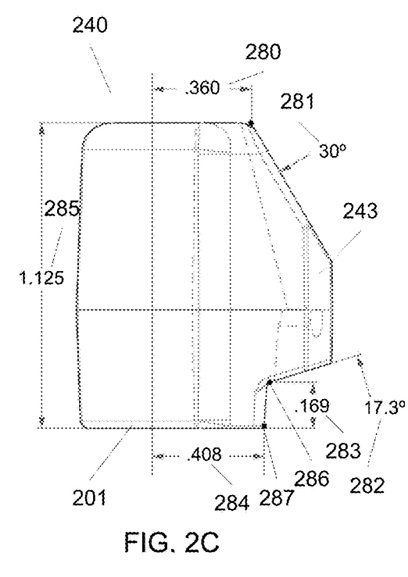
FIG. 2C is a dimensioned side view line drawing of an exemplary embodiment.
Figure 2D:
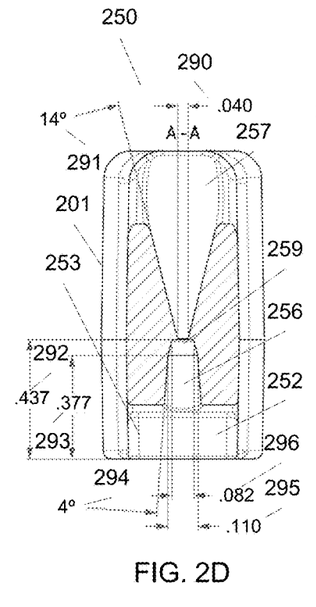
FIG. 2D is a dimensioned A-A sectional view line drawing identified from FIG. 2A.

Extended members are also seen in other views including 222 and 223 in FIG. 2B as well as 252 and 253 in FIG. 2D. The holding ribs are also seen in other views including 230 and 231 in FIG. 2B. The inner face of a slotted curb forming the opening 209 with line escapement slot 213 in FIG. 2A is also identified at 259 in FIG. 2D.

With renewed reference to FIG. 2A, the extended members 202 and 203 are also used for enhanced threading operations of bodied hooks with short exposed shanks accessible between the lure head and the eyelet. Alignment of a bodied hook eyelet with a short exposed shank is achieved by compressing the extended members 202 and 203 using a pressing force on the lure head until the bodied hook is aligned with its eyelet face approximate contact with the inner face of a slotted curb forming the opening 209.

With continued reference to FIG. 2A, the extended members also provide a line escapement slot 212 between the members for removal of threaded hooks (hooks and line) after any threading operation. The line escapement is also identified in another view at slot 228 continuing to 232 in FIG. 2B.

With continued reference to FIG. 2A, the simplified threading method not requiring any manual alignment or holding of forced deformations of the extended members 202 and 203 is performed in three basic steps; first aligning and fixating a hook to be threaded, secondly threading the hook, and finally removing the threaded hook. Tying the hook and line can then be performed starting with a threaded hook. The extended members are also seen in other views including 222 and 223 in FIG. 2B as well as 252 and 253 in FIG. 1D. Another extended member is visible at 242 in FIG. 2C.

The simplified threading method includes accessing the frustoconical cavity 207 through the chamfered side 219 with a hook eyelet and sliding the hook eyelet along the conically narrowing cavity until it is stopped by the slotted curb 208 at its inner face forming the curb 208, then rotatively aligning the hook eyelet face with the inner face of the curb 208 forming opening 209. Once in the aligned position, the hook becomes fixated in the threading apparatus based of frictional forces provided by holding ribs 210 and 211 without the potential for it to slip from or fall out of the threading apparatus regardless of orientation thus freeing a hand for threading the line while the remaining hand holds the threading apparatus body 201.

Threading the line with a fixated hook in threading position is easily accomplished by feeding the line through the frustoconical sector shown as 207 in FIG. 2A and 227 in FIG. 2B, with an alternate view 250 at 257 in FIG. 2D, its open distal end aligned with the hook eye and transitioning through the hook eyelet passing through opening 209 in FIG. 2A at the curb 259 in FIG. 2D and entering in the exit chamber 256 in FIG. 2D to finally emerge from the exit chamber 256 in FIG. 2D. The line and threaded hook can be removed from the threading apparatus by lifting the line with the threaded hook out of the threading apparatus through the line escapement slot 212 in FIG. 2A and 228/232 in FIG. 2B.

With renewed reference to FIG. 2A, the threading apparatus includes a view for clipping or attaching it onto a fishing rod or essentially cylindrical object. The attaching sector view includes two clamping jaws 204 and 205 forming a partially enclosed rod capture and attachment cavity 206 and temporarily deformable to the extent that the jaws 204 and 205 separate from their normal positions at attachment slot 214 temporarily to allow entry and capture of a fishing rod for example. Views other than FIG. 2A, including FIG. 2B-2E, show equivalent functionality pertaining to attachment but alternate orientations of the same features described in FIG. 2A descriptions.

With reference to FIG. 2A dimensioning, the rod capture slot width 271 is nominally 0.080 inches (2 mm). The outer radius of rod capturing members 272 is nominally 0.296 inches (7.52 mm). The inner radius of rod capturing members 273 is nominally 0.146 inches (3.71 mm). The center to center distance 274 is nominally 0.515 inches (13.1 mm) between the rod capture cavity 206 center and the curb opening 209 center. The holding ribs 210/211 separation 275 is nominally 0.006 inches (0.155 mm). The extended members 202/203 outer dimension 276 is nominally 0.411 inches (10.44 mm). The curb opening 209 center to outer edge of the extended members 202/203 is nominally 0.143 inches (3.63 mm).

With reference to FIG. 2B, top view 220, the extended members 222 and 223 of body 201 are shown with their separation forming an a continuous line threading path and line escapement slot starting at the open end 1228 of the chamfered frustoconical cavity 227 to slot 228 and through the curb slot 229 as a continuation to slot 232 thus completing the path. The ribs 230 and 231 allow for line passage and therefore do no block the line threading or escapement path.

With reference to FIG. 2B dimensioning, the holding ribs 230/231 separation 278 is nominally 0.006 inches (0.156 mm).

With reference to FIG. 2C, side view 240, the threading apparatus body 201 shows only a single rod clamping jaw 244 whereby the opposing rod clamping jaw and the rod attachment cavity are hidden from this view.

With reference to FIG. 2C dimensioning, the distance 280 between the rod capture cavity center and the frustoconical chamfer edge is nominally 0.360 inches (9.14 mm). The chamfer angle 281 is nominally 30 degrees. The distal end angle 282 of the extended members from the outside edge to the distal edge is nominally 17.3 degrees. The distance 283 between the extended members' distal edge 286 and edge 287 at the exit end of the body 201 is nominally 0.169 inches (4.29 mm). The distance 284 between the rod capture cavity center and the exit end edge is nominally 0.408 inches (10.36 mm). The length dimension 285 of body 201 is nominally 1.125 inches (28.6 mm).

With reference to FIG. 2D, A-A section view 250, the threading apparatus body 201 is sliced at A-A as indicated in FIG. 2A exposing the eyelet positioning and alignment curb 259. The A-A slice intersects the otherwise extended members 252 and 253 and intersection with the chamfered frustoconical cavity 257.

With reference to FIG. 2D dimensioning, the curb 259 opening 290 is nominally 0.040 inches. The frustoconical cone angle 291 of the frustoconical cavity 257 is nominally 14 degrees. The distance 292 between the exit end of body 201 and the inner alignment and positioning edge of the curb 259 is nominally 0.437 inches (11.1 mm). The distance 293 between the exit end of body 201 and the outer or exit edge of the curb 259 is nominally 0.370 inches (9.4 mm). The line exit chamber 256 taper 294 is nominally 4 degrees. The distal dimension 295 of the exit chamber 256 is nominally 0.110 inches (2.79 mm). The proximal dimension 296 of the exit chamber 256 is nominally 0.082 inches (2.08 mm).

Figure 2E:
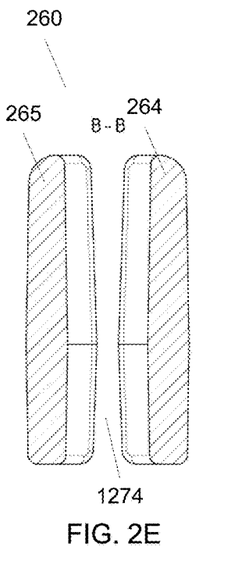
FIG. 2E is a B-B sectional view line drawing identified from FIG. 2A.

With reference to FIG. 2E, B-B section view 260 as indicated in FIG. 2A, the attaching section view includes two rod clamping jaws 264 and 265 of the sliced threading apparatus body forming a partially enclosed attachment slot 1274 and temporarily deformable to the extent that the jaws 264 and 265 separate from their normal positions temporarily to allow entry and capture of a fishing rod for example.

The slotted clip sector shown in FIG. 2E comprising a bottom attachment means of the apparatus (a section of body 201) for attaching the apparatus on an essentially cylindrical mounting member having a range of diameters suitable for clipping the threading apparatus onto includes approximately 0.25 inches (0.64 cm) to 0.4 inches (1 cm) in diameter.

A fishing hook simplified threading method is provided for threading fishing hooks that are typical in size (standard length and shank diameter) and use, not requiring enhanced threading methods. Threading these typical hooks permit a wider range of material properties such as durometer for the facility or threading apparatus body material.

Threading non-typical hooks (having short or thin shanks or small eyelets) require and narrower range of material properties such as lower range durometer (more flexible) for the facility or threading apparatus body material.

Figure 4A:
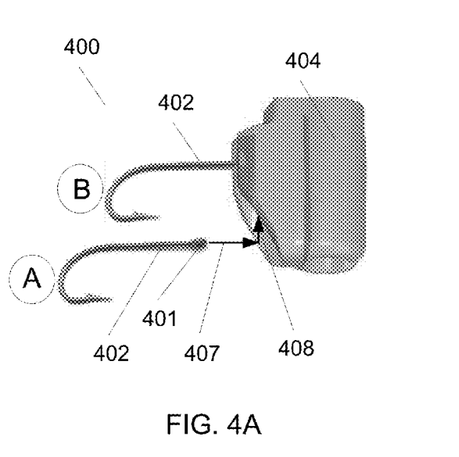
FIG. 4A illustrates a basic use of a threading apparatus for aligning, positioning, and attaching a typical hook into the threading position.

With reference to FIG. 4A, a typical hook attachment sequence 400 for aligning and attaching the hook into a threading apparatus 404 is illustrated starting with hook 402 located at starting position (A). Hook 402 enters the frustoconical sector of threading apparatus 404 with the eyelet 401 entering the frustoconical cavity first along the approximate paths 407 and 408. At the end of path 408 the face of eyelet 401 is aligned and attached at the threading position (not shown in FIG. 4A) with the proximal hook bend at location (B). In this (B) position the typical hook is fixated and positively held or secured in the threading position by the threading apparatus 404.

Figure 4B:
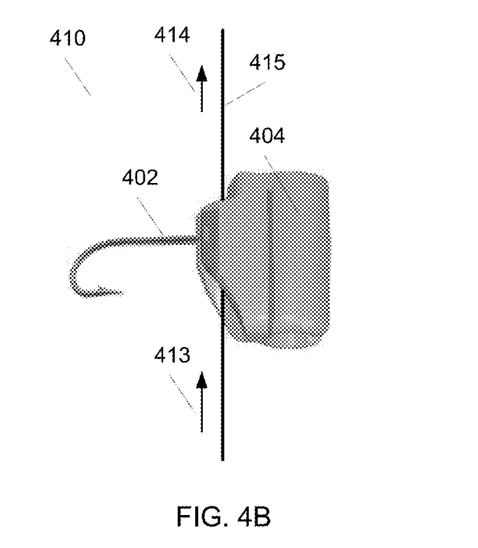
FIG. 4B illustrates a basic or simplified threading step using a threading apparatus for threading an aligned and attached typical hook while in the threading position.

With reference to FIG. 4B, a threaded hook configuration 410 is illustrated with the threaded hook 402 remaining in the threading apparatus 404. The line 415 is shown along path 413 into the hook attached threading apparatus 404 and extending distally along path 414.

Figure 4C:
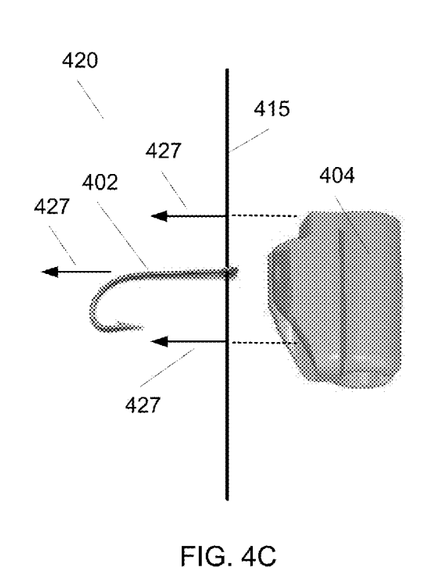
FIG. 4C illustrates a basic or simplified method step for removing a threaded hook after from the threading apparatus.

With reference to FIG. 4C, the complete threaded hook and line combination 420 is illustrated after escapement from the threading apparatus 404. The escapement path for line 415 and threaded hook 402 is illustrated as path 427.

Figure 3A:
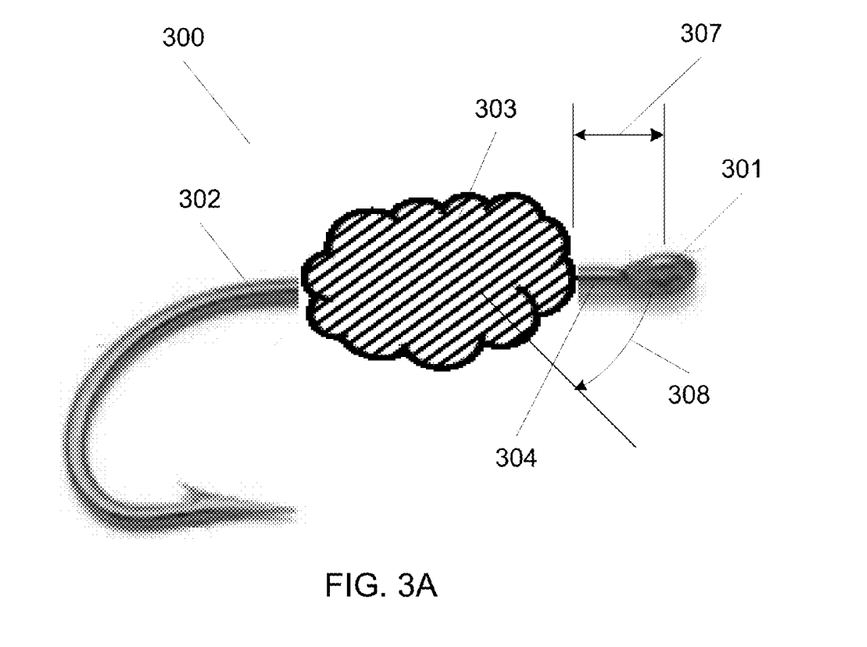
FIG. 3A illustrates the general structure for various configurations and features of bodied hooks.

With reference to FIG. 3A, enhanced threading methods in conjunction with a threading apparatus provide threading solutions for relatively small hooks or thin hook shanks, or bodied hooks 300 such as shown in FIG. 3A as hook 302, with an eyelet 301 and a shank 304, and an exposed shank length 307. The small hooks as identified are inherently problematic or unreliable to thread either manually or using alternate means including embodiments other than this invention.

With continuing reference to FIG. 3A, general feature 303 is depicted to localize any of the following embodiments; weight, lure (or fly) head, lure (or fly) body, or anything attached to the hook shank for any fishing related reason. Examples of these featured embodiments are shown in FIGS. 5B-5E.

With continuing reference to FIG. 3A, the exposed portion of the shank 304 shown with length 307 may also have any one of several embodiments; for example, the shank may have a bend of angle 308 with a vertex as shown inside of feature 303. An example of this type of bend angle embodiment 308 can be seen in FIG. 5C with a shank bend within the fishing fly body. The invention can be used successfully with either of these exposed shank portion embodiments by means of an enhanced threading method as described herein.

With continuing reference to FIG. 3A, an alternate embodiment having a bend of angle 308 includes a shank bend with a vertex located between the feature 303 and the eyelet 301 (not shown). A hook eyelet face plane involved in this form of shank bend may be aligned with the bent shank plane or orthogonal to the bent hook shank plane.

The invention can be used successfully for threading any configuration of the eyelet/shank forms including multiple orthogonal or non-orthogonal bends by means of a simplified threading method or one of the enhanced threading methods as described herein.

Enhanced threading methods include the manipulation of the flexible threading apparatus or facility body in response to forces exercised by the operator through the fishing hook or bodied hook embodiments or forms during alignment and positioning of the hook or bodied hook.

Figure 3B:
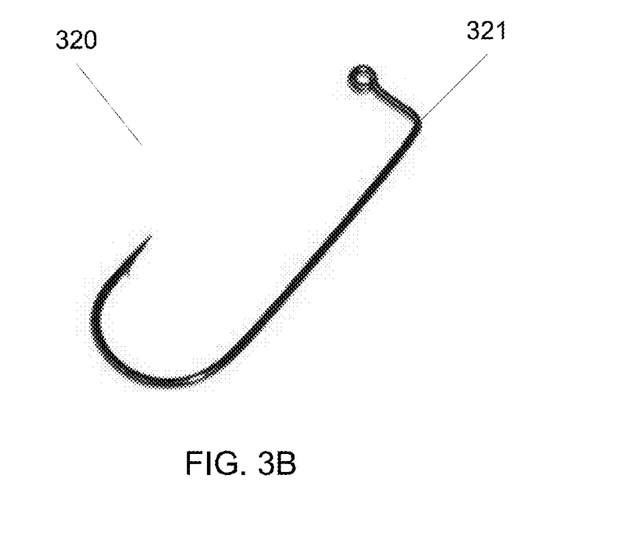
FIG. 3B is a pictorial view of a hook with an exemplary single orthogonal bend near its eyelet.

With reference to FIG. 3B, hooks with a wire formed shank near the eyelet is subject to an enhanced line threading method involving manipulating or deforming the line threading apparatus. The shank may include one or more bends near the eyelet including an exemplary orthogonal bend embodiment 320 as shown in FIG. 3B.

Figure 5A:
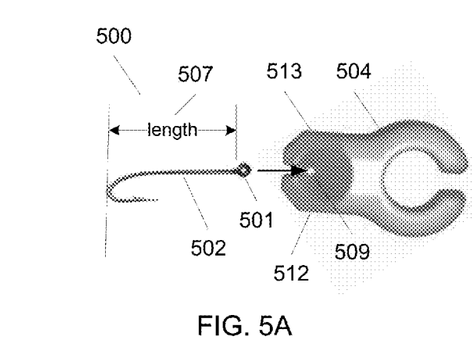
FIG. 5A illustrates the presentation of a small eyeleted or thin shanked hook to a threading apparatus requiring enhanced method steps to align and hold the small hook eyelet in the threading position.
Figure 5B:
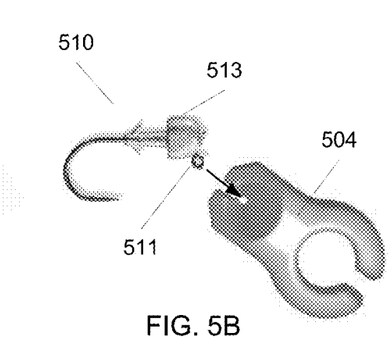
FIG. 5B illustrates the presentation of a weighted type of bodied hook with large head and a short, angled shank to a threading apparatus requiring enhanced method steps to align and hold the weighted hook eyelet in the threading position.
Figure 5C:
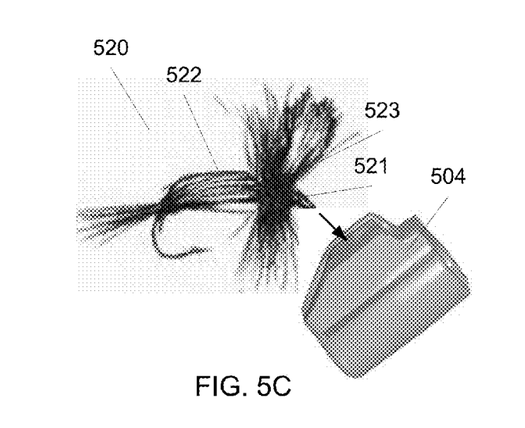
FIG. 5C illustrates the presentation of a fishing fly lure type of bodied hook with a small head and a short, angled shank to a threading apparatus requiring enhanced method steps to align and hold the lure hook eyelet in the threading position.
Figure 5D:
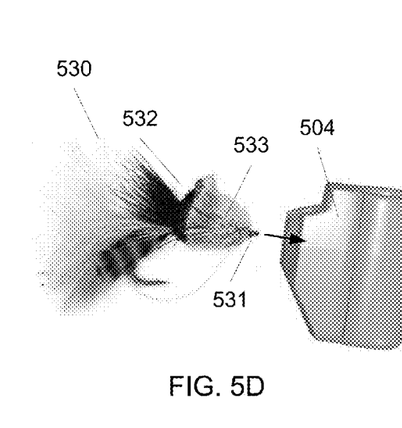
FIG. 5D illustrates the presentation of a fishing fly lure type of bodied hook with a large head and a short exposed shank to a threading apparatus requiring enhanced method steps to align and hold the lure hook eyelet in the threading position.
Figure 5E:
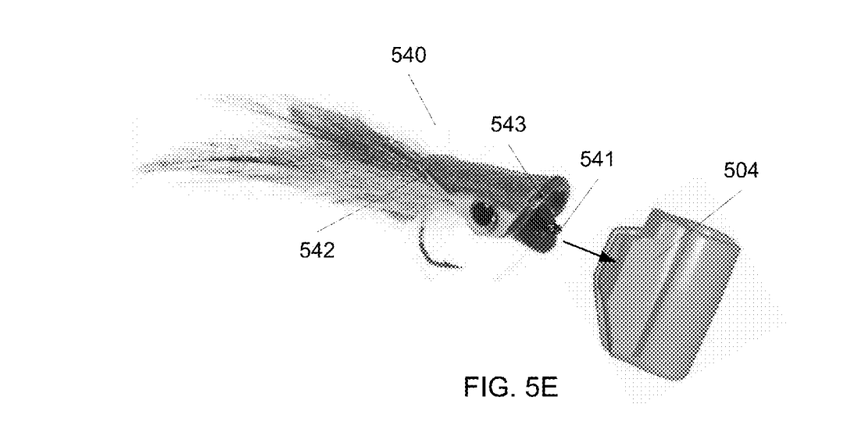
FIG. 5E illustrates the presentation of a top water fishing fly lure type of bodied hook with a large head and a short exposed shank to a threading apparatus requiring enhanced method steps to align and hold the lure hook eyelet in the threading position.

With reference to FIGS. 5A-5E, a threading apparatus 504 is shown with various viewing angles to clearly show the interfaces between the threading apparatus 504 and each of the exemplary hook embodiments; a hook as illustrated in FIG. 5A, a weighted hook as illustrated in FIG. 5B, and lure hooks as illustrated in FIGS. 5C-5E.

Each of the exemplary embodiments illustrated in FIGS. 5B-5E are members a class of hook embodiments defined herein as "body hooks."

With reference to FIG. 5A, a small hook configuration 500 is illustrated with a hook 502 having length 507 impending the threading apparatus 504 for alignment. The hook is placed and held by an operator to be concentric with opening 509 until extended members 512 and 513 are squeezed by the operator and held into position by increased frictional force at holding ribs, (not identified in FIG. 5A, but nevertheless located on the inside walls of the extended members 512 and 513), for gripping the small hook shank. The same holding ribs are identified in other views such as 110 and 111 in FIG. 1A as well as 210 and 211 in FIG. 2A.

With continued reference to FIG. 5A, members 512 and 513 are referred to as "extended members" providing a squeezing sector for enhanced threading operations requiring temporary inward deformation of the extended members and adding frictional holding force to the eyelet and hook shank primarily at the holding ribs. The increased frictional force at the holding ribs resulting from squeezing the extended members is maintained by the operator until the small hook threading step is completed.

After the small hook threading step is completed, the extended members 512 and 513 are released allowing the threaded hook to exit through an escapement path provided by the frustoconical chamfer, the slotted curb (not shown in FIG. 5A but identified as a line escapement slot 113 in FIG. 1A is also seen at 159 in FIG. 1D), and the slot provided between the extended members 512 and 513.

The line threading apparatus of this disclosure as partially dimensioned in FIGS. 2A-2D may also be increasingly scaled or decreasingly scaled to target other hook size ranges for simplified threading methods within those scaled size ranges. At any level of scaling a threading apparatus or facility, there may remain upper and lower hook size ranges requiring an enhanced threading method.

The Hook Size Table below lists exemplary hook size # vs. length (L) indicates three ranges; standard length range hooks supported by the exemplary line threading apparatus dimensioned in FIGS. 2A-2D in this disclosure, a standard length/thin hook shanks range wherein especially thin hook shanks may require an enhanced threading method, and upper range hooks with large eyelets accessible by scaling up the threading apparatus dimensioned in FIGS. 2A-2D in this disclosure.

Standard Range hook lengths/sizes without especially or untypically thin hook shanks, (typically associated with specialty metals) extend from size #14 to 1/0 hooks in the table shown below, are supported by a simplified threading method and facilitated by the line threading apparatus without deformation of the extended members.

| Hook # | Length (L) (cm) | Length (L) (in) | |
|--------|-----------------|-----------------|---|
| 4/0 | 4.76 | 1.875 | Upper Range Hooks with Large Eyelets |
| 3/0 | 4.45 | 1.75 | |
| 2/0 | 4.13 | 1.625 | |
| 1/0 | 3.81 | 1.5 | |
| 1 1/2 | 3.5 | 1.375 | |
| 1 | 3.18 | 1.25 | |
| 2 | 2.86 | 1.125 | |
| 3 | 2.54 | 1 | |
| 4 | 2.38 | 0.9375 | |
| 5 | 2.22 | 0.875 | Standard Length/Standard Shank Diameter Hooks Supported with Simplified threading method |
| 6 | 2.06 | 0.8125 | |
| 7 | 1.91 | 0.75 | |
| 8 | 1.75 | 0.6875 | |
| 9 | 1.59 | 0.625 | |
| 10 | 1.43 | 0.5625 | Standard Length/Thin Hook Shanks (small diameter) |
| 11 | 1.27 | 0.5 | |
| 12 | 1.11 | 0.4375 | |
| 13 | 0.95 | 0.375 | |
| 14 | 0.79 | 0.3125 | |
| 15 | 0.64 | 0.25 | Lower Range: Small Hooks with Small Eyelets and Thin Shank Diameters |
| 16 | 0.48 | 0.1875 | |
| 17 | 0.32 | 0.125 | |
| 18 | 0.16 | 0.0625 | |

Smaller hook designations from hook size #15 and smaller are defined as and associated with short lengths, thin hook shanks, and/or small eyelets. Smaller hook sizes, are subject to an enhanced line threading method and facilitated by manipulating the flexible line threading apparatus by deforming the extended members according enhanced methods as described herein.

Exemplary hook shank diameters supported by the exemplary threading apparatus embodiment as scaled and dimensioned in FIGS. 2A-2D, and the simplified threading method, are further approximated as follows:

a. a hook size #5 shank diameter is approximately 0.038 inches (1 mm)

b. a hook size #14 shank diameter is approximately 0.027 inches (0.7 mm)

Hook shank diameters vary significantly between hooks based on size, materials used, and manufacturer designs. However, the invention's apparatus, facility, materials, scalability, and methods encompass all possible hook sizes, lengths, shank diameters, and eyelet sizes.

The threading apparatus or facility of this invention provides a flexible transition for hook sizes that could be threaded normally using a simplified method versus slightly smaller sizes that may need an enhanced threading method. This invention includes facilities and methods for threading a very wide range of hook sizes and shapes including the hook's constituent parts further including lengths, shank diameters and eyelet outside and inside opening diameters.

With reference to FIG. 5A, hooks with body such as weighted hook 510 is shown with eyelet 511 impending the threading apparatus 504 for alignment. The class of weighted hooks may have the eyelet on the same axis as the shank or the eyelet 511 may be rotated as shown extended from the weighting formation or body 512. A rotated eyelet may be rotated at any angle between 0 degrees (on axis) to as much as 90 degrees in any off axis angular direction and extending from the body with an arbitrary separation. The separation between the eyelet and the body shown in FIG. 5B is slight.

Fishing flies or lures such as examples 520 in FIG. 5C, 530 in FIG. 5D, and 540 in FIG. 5E are subject to an enhanced line threading method due to short exposed shanks or small eyelets and facilitated by manipulating the line threading apparatus 504. The use of the term lure hook is invoked herein to mean a hook with any fish attracting body attached to the hook between the curved portion of the hook and the hook eyelet.

With reference to FIG. 5C, the lure hook 520 includes a body 522 and a small head 523 located near the eyelet 521. To manipulate the threading apparatus 504 for this type of lure hook the enhanced threading operation requires the manipulator to grasp the body 522 with a thumb and forefinger for example and provide a pressing and alignment force at the threading position of the flexible threading device 504. The flexibility of the threading apparatus 504 is due to its elastomeric and other material properties allowing a hook eyelet to be alignable for threading.

With reference to FIG. 5D, the lure hook 530 includes a body 532 and a large head 533 located near the eyelet 531 shown impending the threading apparatus 504 for alignment.

With reference to FIG. 5E, the lure hook 440 includes a body 442 and a large firm contoured head 443 located near the eyelet 541 shown impending the threading apparatus 504 for alignment.

The class of less typical (small size, wire formed, or weighted) hooks and lure hooks as illustrated in FIGS. 5A-5E, require a more flexible, wider range of material properties (such as durometer) for the facility of a flexible threading apparatus body 504 as used in conjunction with the associated enhanced threading methods.

Any and all threading operations may be performed with a threading apparatus attached to any rod or rod like member including a fishing rod for example. Otherwise, with a threading apparatus not attached to any rod like member, threading is performed by human hand manipulation with slightly less convenience but nevertheless effective.

Figure 4D:
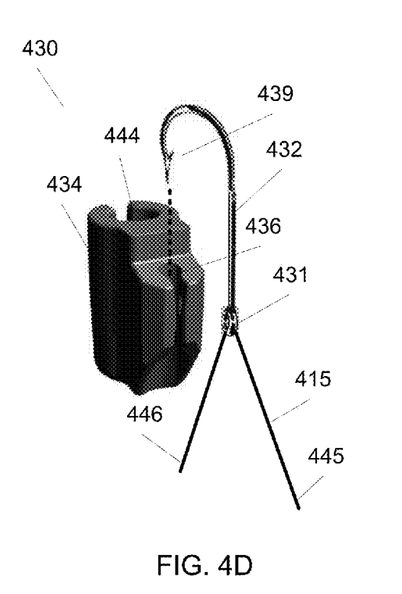
FIG. 4D illustrates a method step for placing a threaded hook barb into a threading apparatus cavity facilitating a method step for tying the threaded line to the hook at the eyelet.

With reference to FIG. 4D, a line tying configuration 430 is illustrated and a method for tying the line 415 to the associated threaded hook 432 is comprehended. After the threaded hook 432 has been removed from the threading apparatus 434 (equivalent to 404 in FIG. 4C), the hook barb 439 is inserted into the exit chamber 436 to secure it for tying. The threading apparatus 434 may be attached to an essentially rod like member (not shown) at rod attachment clip 444 to secure the tying configuration or facility while tying the two line members 445 to 446 at eyelet 431. In this secured line tying configuration or facility any knot can be tied with ease such as a fisherman's knot and the threaded tied hook is removed from the threading apparatus.

Methods for threading various hook and bodied hook types and sizes are inclusive and wide-ranging.

Figure 6A:
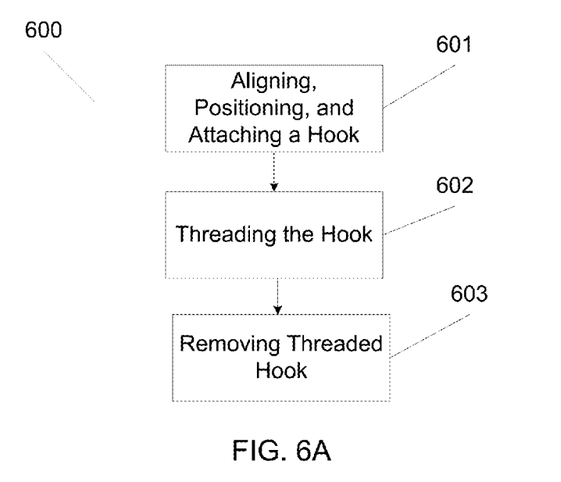
FIG. 6A is a flow chart describing the basic or simplified method steps in using a threading apparatus for typical uses.
Figure 6B:
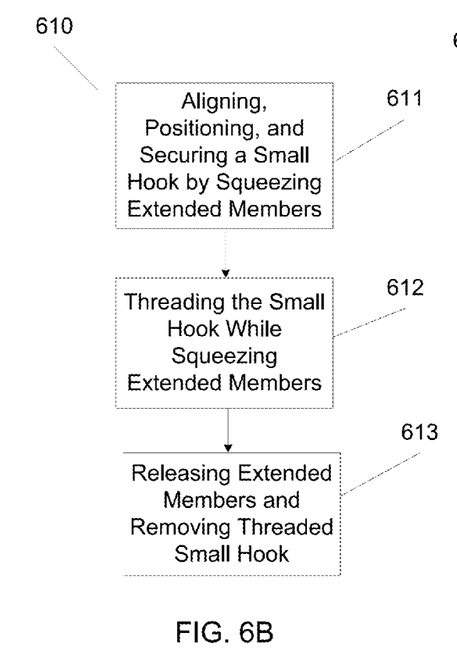
FIG. 6B is a flow chart describing the enhanced method steps for threading small hooks or hooks with thin shanks.
Figure 6C:
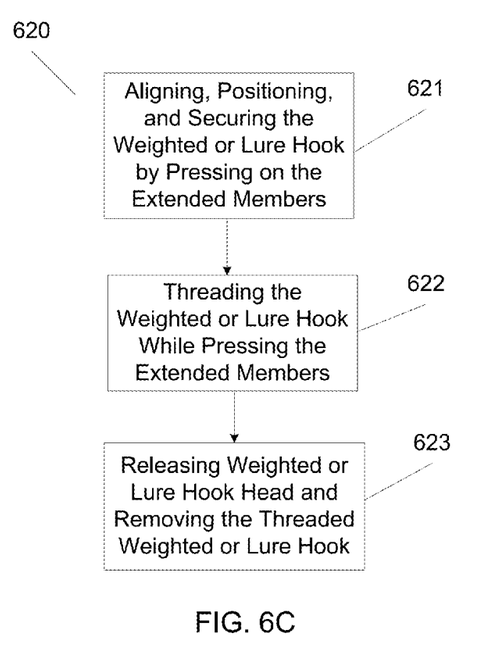
FIG. 6C is a flow chart describing the enhanced method steps for threading bodied hooks with short exposed shanks

Referring to FIGS. 6A, 6B, and 6C, the methods are generally separable into simplified (FIG. 6A) and enhanced (FIG. 6B-6C) threading methods. Additional method details are provided herein for each of the threading methods as follows:

Simplified methods are applicable Standard Length/Standard Shank Diameter Hooks Supported which are typical hooks larger than the previously identified small hooks or hooks with shank thickness larger than the previously identified thin hook shanks. Typical hooks are hooks that can be aligned and positioned within a threading apparatus resulting in retaining the positioned hook in such a way that it will not fall out of the threading apparatus due to gravity and orientations or motions involving accelerations less than or equal to gravitational acceleration.

A simplified general threading method 600 of FIG. 6A includes hook aligning/positioning/attaching 601, threading 602, and removing the threaded hook 603 via escapement further encompassing method steps:
 a. positioning and aligning a hook to be threaded,
 b. inserting a line through the chamfer of the frustoconical sector
 c. extending the line through the distal end of the frustoconical sector
 d. passing the line through the hook eyelet and extending through and beyond the exit chamber
 e. lifting the line with the threaded hook out of the threading apparatus through the collective line escapement slot An enhanced threading method for small hooks or hooks with thin shanks 610 includes hook aligning/positioning/securing by squeezing the extended members of the threading apparatus 611, threading while squeezing the extended members 612, and releasing the extended members and removing the threaded hook 613 via an escapement pathway:
 a. positioning and aligning a small hook to be threaded
 b. squeezing the extended members of the threading apparatus and securing the small hook
 c. inserting a line through the chamfer of the frustoconical sector
 d. extending the line through the distal end of the frustoconical sector
 e. passing the line through the small hook eyelet and extending through and beyond the exit chamber of the threading apparatus
 f. releasing the extended members of the threading apparatus to free the threaded small hook
 g. lifting the line with the threaded small hook out of the threading apparatus through the collective line escapement slot An enhanced threading method 620 for bodied hooks with short exposed shanks includes hook aligning/positioning/securing by pressing and compressing the extended members of the threading apparatus 621, threading while pressing the extended members 622 and maintaining alignment, and releasing the extended members and removing the threaded bodied hook 623 via an escapement pathway:
 a. positioning and aligning a bodied hook with a short exposed shank to be threaded
 b. securing the bodied hook by compressing the extended members of the threading apparatus and maintaining alignment of the bodied hook
 c. inserting a line through the chamfer of the frustoconical sector d. extending the line through the distal end of the frustoconical sector
e. passing the line through the bodied hook eyelet and extending through and beyond the exit chamber of the threading apparatus
f. releasing the bodied hook
g. lifting the line with the threaded bodied hook out of the threading apparatus through the collective line escapement slot A tying method includes securing a threaded hook by placing the hook barb into exit chamber of a threading apparatus which is further secured through the rod attachment clip onto a rod like member such as a fishing rod, tying the line at the hook eyelet and removing the tied hook from the threading apparatus. This tying method applies to any hook or body hook including weighted hooks or lure hooks.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fish hook threading apparatus comprising:
   a body having a top side, a bottom side, an intermediate portion between the top and bottom sides, and proximal and distal ends which define a longitudinal axis therebetween, said body responding to compressive forces communicated to said body facilitating an enhanced alignment and holding of a fish hook, the body further comprising:
      a slotted clip molded sector at the bottom side of the body and comprising an attachment means of the threading apparatus for attaching the threading apparatus on a cylindrical mounting member, said slotted clip molded sector comprising a pair of clamping jaws which define an attachment cavity and an attachment slot therebetween;
      a line threading molded sector at the top side of the body opposite the slotted line clip molded sector, the line threading molded sector comprising:
         a pair of extended members on opposing sides of the line threading molded sector;
         a chamfered surface extending from a first end thereof at the proximal end of the body toward the distal end of the body and terminating at a second end thereof located between the proximal and distal ends of the body, the chamfered surface extending along the pair of members at an angle with respect to the longitudinal axis of the body;
         a frustoconical cavity defined between the pair of members, the frustoconical cavity extending from a first end thereof at the chamfered surface to a second end thereof between the proximal and distal ends of the body, the first end of the frustoconical cavity having a first opening which has a larger diameter than a second opening at the second end of the frustoconical cavity;
         a hook eyelet alignment and positioning curb located at the second end of the frustoconical cavity and extending toward the distal end of the body, the hook eyelet alignment and positioning curb aligned with the second opening of the frustoconical cavity, the hook eyelet alignment and positioning curb comprising:
            a curb inner face facing toward the distal end of the body and away from the second opening of the frustoconical cavity;
            a curb outer face extending from the curb inner face toward the distal end;
            a curb opening for aligning with an eyelet of the fishing hook to thread the line through the eyelet, the curb opening defined by the curb inner face and the curb outer face, the curb opening being in communication with the second opening of the frustoconical cavity;
            a curb slot providing an escapement for the line out of the hook eyelet alignment and positioning curb after threading, the curb slot located between the curb opening and the top side of the body;
            wherein when the eyelet of the fishing hook is flush against and aligned and positioned at the curb inner face, a threading path for a line through the eyelet is formed;
      a first line escapement slot extending in generally parallel relation to the longitudinal axis of the body between the curb slot and the top side of the body;
      at least one pair of elongated hook shank holding ribs providing a means for holding the fish hook in place at a shank of the fish hook as the eyelet of the fish hook is flush and aligned and positioned at the curb inner face, each of the elongated hook shank holding ribs of the at least one pair of elongated hook shank holding ribs extending from a respective extended member of the pair of extended members, the at least one pair of elongated hook shank holding ribs located between the first line escapement slot and the top side of the body; and
      a second line escapement slot for allowing lifting of the line out of the fish hook threading apparatus, said second line escapement slot extending in generally parallel relation to the longitudinal axis of the body between the at least one pair of elongated hook shank holding ribs and the top side of the body, said second line escapement slot communicating with an exterior of the fish hook threading apparatus;
      wherein after the line has been threaded through the eyelet, the line and the fishing hook can be moved outside of the threading apparatus from the frustoconical cavity and curb opening by passing the line through the curb slot, then the first line escapement slot, then past the at least one pair of elongated hook shank holding ribs, and finally through the second line escapement slot to the exterior of the fish hook threading apparatus.

2. The threading apparatus of claim 1, wherein the pair of extended members of the body facilitates an enhanced threading operation for a range of small hook sizes comprising size #15 and smaller, wherein when the eyelet is aligned with the curb inner face wherein a squeezing force across the pair of extended members of the body comprises a squeezing factor to reduce a size of the first line escapement slot until a holding force is established for the hook shank substantially at the at least one pair of elongated hook shank holding ribs providing frictional force to the hook shank as grippers and maintained until the enhanced threading operation is completed.

3. The threading apparatus of claim 1, comprising the molded elastomeric material comprising the plurality of extended members of the body facilitates an enhanced threading operation for the fishing hook which is a bodied hook with a short exposed shank length comprising an approximate length of 0.14 inch or 3.56 mm or less, wherein the bodied hook eyelet is moved into position by a pressing force at a body thereof thereby compressing the pair of extended members inwardly aligning an eyelet face of the bodied hook eyelet with a center of the curb inner face and curb opening and held in place by a sustained pressing force until a threading operation is completed.

4. The threading apparatus of claim 1, wherein the body comprises a material which is comprised of a natural or synthetic polymer elastomer having elastic properties.

5. The threading apparatus of claim 4, wherein the elastomer comprises TPE which is a physical mix of polymers.

6. The threading apparatus of claim 1, wherein the pair of elongated hook shank holding ribs are elongated in alignment with the curb opening and first and second line escapement slots.

7. The threading apparatus of claim 6, wherein the at least one pair of elongated hook shank holding ribs are located symmetrically on opposite walls of the pair of extended members.

8. The threading apparatus of claim 1, wherein said body comprises a molded elastomeric material with a durometer of 30 to 75.

9. The threading apparatus of claim 1, wherein a range of diameters of the cylindrical mounting member suitable for attachment of the slotted clip sector comprises approximately 0.25 inch or 0.64 cm to 0.4 inch or 1 cm.

* * * * *